Aug. 27, 1940.  S. B. KURZINA, JR  2,213,165
COASTER BRAKE
Filed March 28, 1939   3 Sheets-Sheet 1
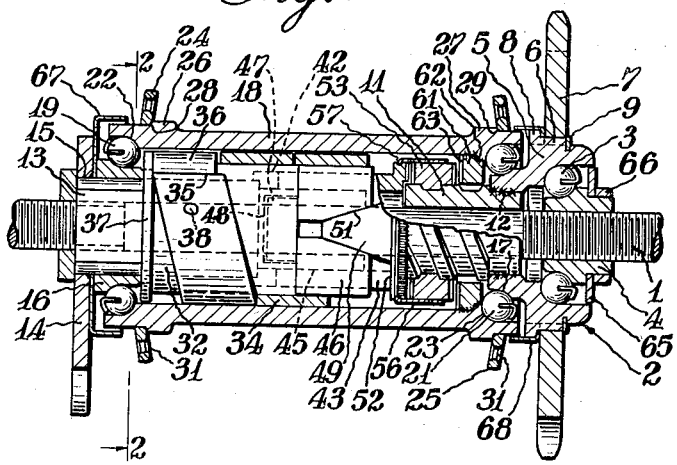
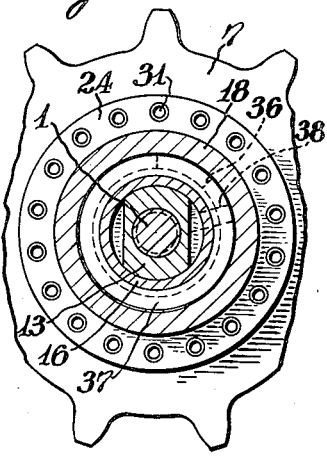
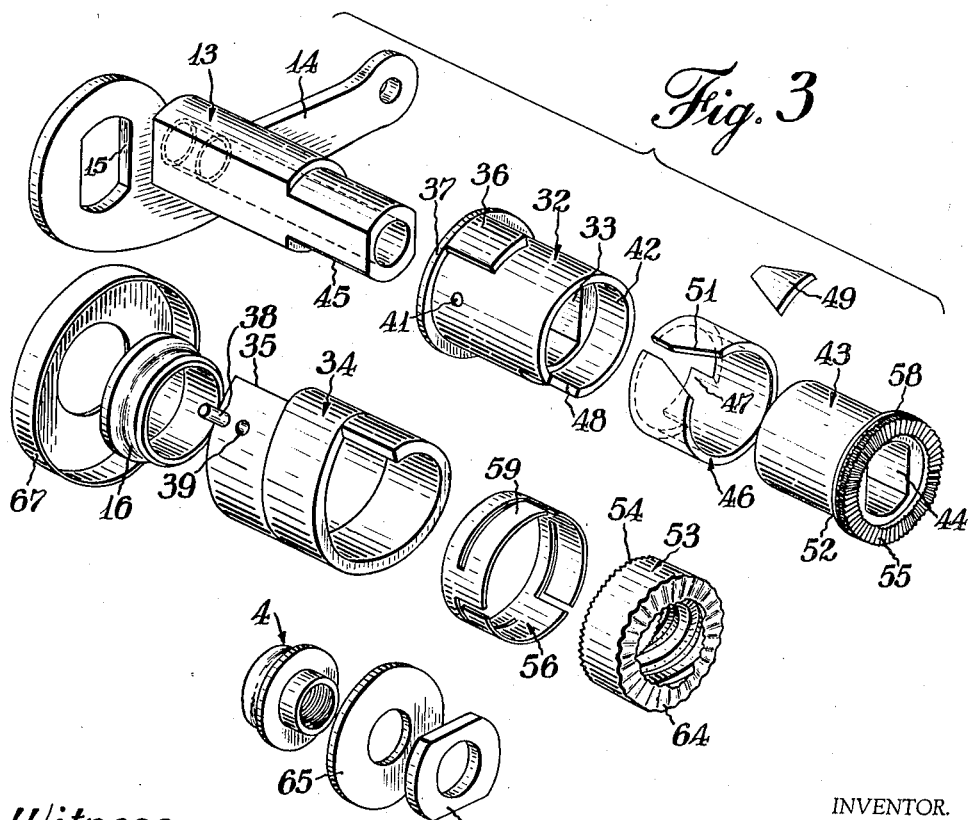
INVENTOR.
Stanley B. Kurzina Jr.
BY Clinton S. Janes
ATTORNEY.

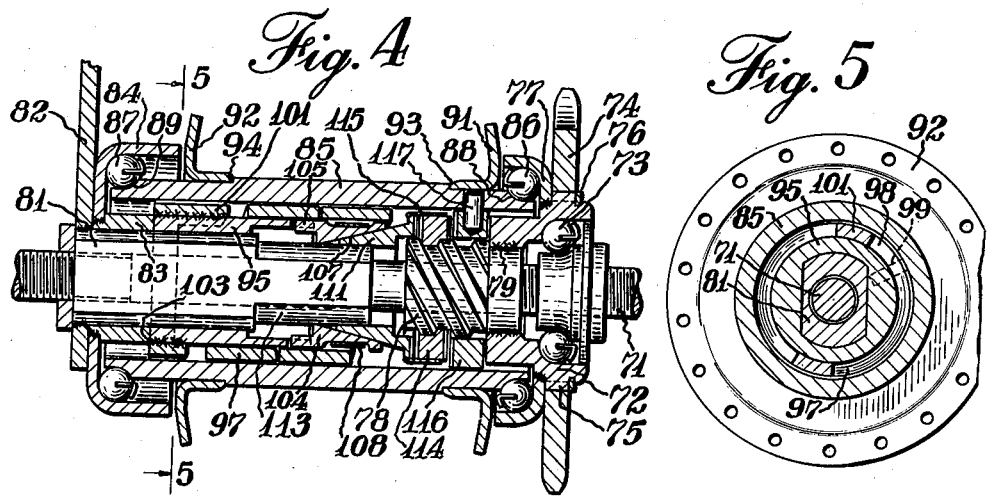
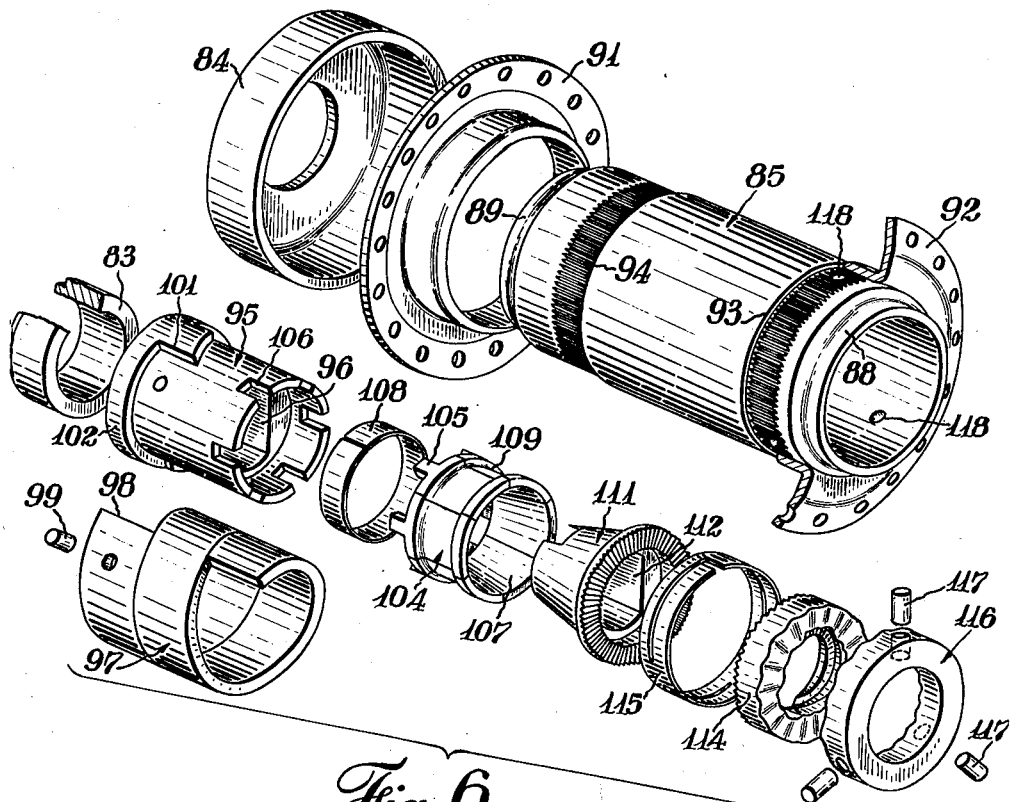

Aug. 27, 1940.            S. B. KURZINA, JR            2,213,165
                              COASTER BRAKE
                          Filed March 28, 1939        3 Sheets-Sheet 3
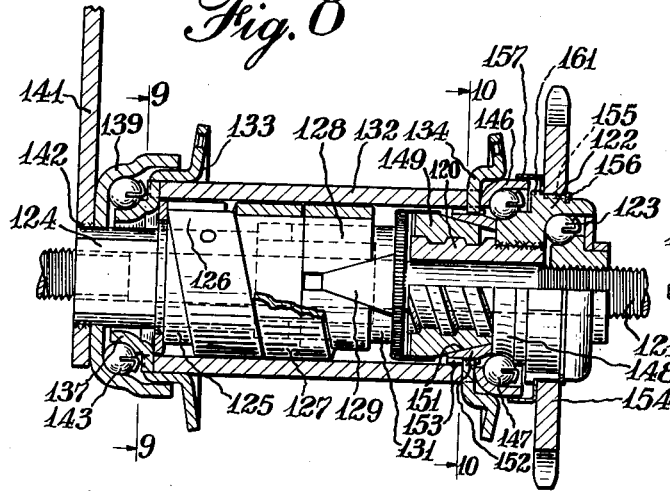
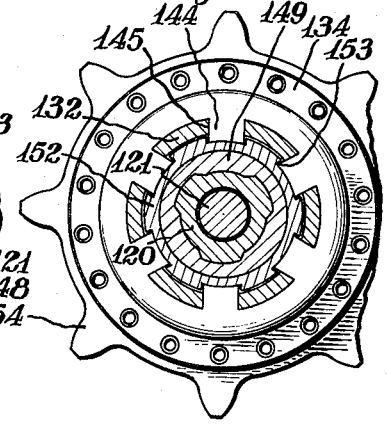
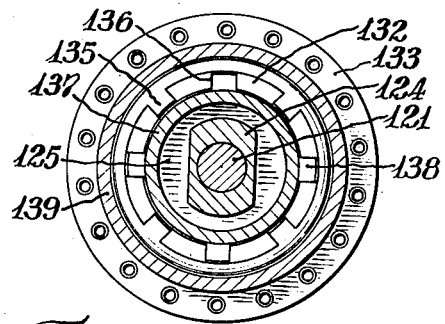
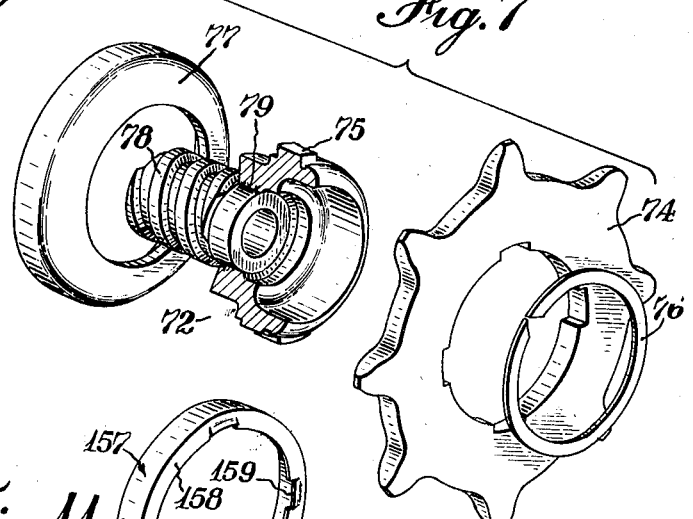
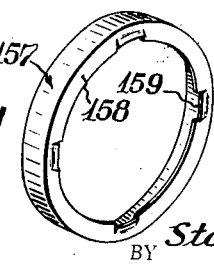
INVENTOR.
Stanley B. Kurzina Jr.
BY
ATTORNEY.
Witness:
Burr W. Jones Patented Aug. 27, 1940

2,213,165

UNITED STATES PATENT OFFICE 2,213,165

COASTER BRAKE

Stanley B. Kurzina, Jr., Elmira, N. Y., assignor to Bendix Aviation Corporation, South Bend, Ind., a corporation of Delaware Application March 28, 1939, Serial No. 264,609

14 Claims. (Cl. 192—6)

The present invention relates to a coaster brake for velocipedes and more particularly to a back-pedaling hub brake for bicycles and the like.

It is an object of the present invention to provide a novel coaster brake incorporating a spiral brake member engageable with the interior of the hub.

It is another object to provide such a device in which the braking reaction tends to assist the application of the brake by servo action.

It is a further object to provide such a device in which the braking torque is transmitted from the anchored end of the brake through an anchor sleeve to a torque arm independently of the wheel axle.

It is another object to provide such a device in which the free end of the brake is controlled by an expander splined on the anchor sleeve and movable longitudinally by backward motion of the driving mechanism.

It is another object to provide such a device in which forward rotation is transmitted to the hub through a clutch member anchored in the interior of the hub.

It is another object to provide such a device in which the drive clutch member is splined in the hub with freedom for longitudinal movement so as to relieve the hub bearings of longitudinal pressure therefrom.

It is another object to provide such a device which is efficient in operation and of simple and economical construction.

Further objects and advantages will be apparent from the following description taken in connection with the accompanying drawings in which:

Fig. 1 is a longitudinal section with certain parts broken away and others shown in elevation, of a preferred embodiment of the invention;

Fig. 2 is a section taken substantially on the line 2—2 of Fig. 1;

Fig. 3 is an expanded view in perspective of the details of the interior structure of Fig. 1;

Fig. 4 is a view similar to Fig. 1 of another embodiment of the invention;

Fig. 5 is a section taken substantially on the line 5—5 of Fig. 4;

Fig. 6 is an expanded view in perspective of details of the structure of Fig. 4, certain parts being broken away for the sake of clarity;

Fig. 7 is a similar view of the driving member, sprocket and associated parts;

Fig. 8 is a view similar to Fig. 1 of a third embodiment of the invention;

Fig. 9 is a section taken substantially on the line 9—9 of Fig. 8;

Fig. 10 is a section taken substantially on the line 10—10 of Fig. 8; and

Fig. 11 is a detail in perspective of the bearing closure and anti-rattling member illustrated in Fig. 8.

In Fig. 1 of the drawings there is illustrated a hub brake structure comprising an axle 1 on one end of which a driving member 2 is journalled by means of an anti-friction bearing 3 which is adjustable by means of a cone bearing member 4 threaded on the end of the axle. Driving member 2 comprises a body portion 5 which is provided with peripheral splines 6 on which a sprocket 7 is non-rotatably mounted. A shoulder 8 formed on the periphery of the body member 5 acts as an abutment for the sprocket, and suitable means such as a split lock ring 9 is provided for holding the sprocket on its mount. Drive member 2 further comprises a screw shaft 11 piloted within the body 5 of the drive member and rigidly connected therewith as by welding or brazing as indicated at 12.

An anchor member in the form of a sleeve 13 (Fig. 3) is loosely mounted on the opposite end of the axle 1 from the drive member 2. Anchor sleeve 13 is of non-circular or double-D section and has mounted on its outer end a torque arm 14 provided with an opening 15 fitting on the anchor sleeve and fixed thereto as by welding or brazing. A bearing cone 16 is loosely mounted on the anchor sleeve 13 adjacent the torque arm 14, and a similar cone bearing 17 is formed on the driving member 2. A wheel hub 18 is journalled on the anchor sleeve and driving member by means of anti-friction bearings 19 and 21 cooperating respectively with the cones 16 and 17 and with bearing cups 22 and 23 formed in the ends of the hub 18.

Spoke flanges 24 and 25 are mounted on the ends of the hub 18 against shoulders 26 and 27 respectively, the flanges being preferably brazed in place as indicated at 28 and 29 and being provided with openings 31 for the reception of wire spokes.

A cylindrical anchor block 32 having a double-D bore 33 is non-rotatably mounted on the anchor sleeve 13 adjacent the bearing cone 16. A spiral brake member 34 is loosely mounted on the anchor block 32, one end 35 of the brake member being in abutting relation with a lug 36 welded on or formed integrally with the anchor block and positioned longitudinally by means of a thrust flange 37 on the anchor block. The end of the spring is preferably maintained in such position by suitable means such as a pin 38 (Fig. 1) traversing an opening 39 (Fig. 3) in the spring and an opening 41 in the anchor block.

Anchor block 32 is provided with a counterbore 42 in which is piloted an expander sleeve 43 having a double-D bore 44 slidably but non-rotatably mounted on a reduced section 45 of the anchor sleeve 13. A split expanding thimble 46 is mounted on the expander sleeve 43 in abutting relation with the anchor block 32, being non-rotatably connected therewith as by means of a lug 47 engaging in a notch 48 in the anchor block. The external diameter of the thimble 46 is normally the same as that of the anchor block 32 and the free end of the spiral brake member 34 surrounds and bears on said thimble.

An expanding wedge 49 is arranged to enter a tapered recess 51 in the thimble and project therefrom as illustrated in Fig. 1 to engage a shoulder 52 on the end of the expander sleeve 43 whereby longitudinal movement of the expander sleeve to the left in Fig. 1 causes the wedge to enter the recess 51 and expand the thimble.

An actuating member 53 in the form of a nut threaded on the screw shaft 11 of the driving member is provided with teeth 54 arranged to engage teeth 55 formed on the end of the expander sleeve 43 to prevent relative rotation between the actuating member and expander sleeve when the actuating member is traversed to the left in Fig. 1. A spring detent member 56 in the form of a cylinder having a flange 57 (Fig. 1) clamped into a groove 58 (Fig. 3) in the periphery of the shoulder 52 of the expander sleeve 43, has spring fingers 59 bearing frictionally on the actuating member 53 to retard rotation of the actuating member so as to ensure its traversal upon rotation of the screw shaft by the sprocket 7.

Driving means for the wheel hub 18 from the actuating member is provided in the form of a driven clutch member 61 mounted in the hub 18 against a shoulder 62 and rigidly connected therewith as by welding or brazing. Clutch 61 is provided with teeth 63 adapted to engage with teeth 64 on the actuating member 53 when the latter is traversed to the right in Fig. 1 by forward rotation of the driving member and screw shaft.

Bearings 3 are preferably enclosed by means of a disc 65 mounted on a reduced portion of the bearing cone member 4 and maintained thereon by a ring 66 welded or brazed on the cone member 4 and provided with a double-D section to facilitate adjustment of the bearings by means of a wrench or spanner.

Bearings 19 are preferably enclosed by means of a dust cap 67 mounted on the anchor sleeve 13 between the torque arm 14 and bearing cone 16. Bearings 21 are also enclosed by a dust cap or thimble 68 mounted on the driving member 2 and having an inwardly extending flange interposed between the sprocket 7 and shoulder 8.

In the operation of this embodiment of the invention, forward rotation of the sprocket 7 causes rotation of the driving member 2 and screw shaft 11, causing traversal of the actuating member 53 to the right in Fig. 1 to engage the driven clutch member 61, whereupon rotation is transmitted to the hub 18 to propel the vehicle. When rotation of the sprocket 7 is stopped as in coasting, the actuating member 53 is rotated sufficiently by the clutch member 61 to cause it to back away and disengage therefrom, whereupon the hub 18 rotates freely.

When the sprocket 7 is rotated backward, actuating member 53 is traversed to the left by virtue of the retarding action of detent 56 until it engages the expander sleeve 43. Further backward rotation of the driving member causes the actuating member to move the expander sleeve to the left, causing the wedge 49 to enter the split thimble 46, causing it to expand and thereby expand the free end of the brake member 34 into engagement with the interior of the wheel hub 18. The spiral brake member 34 is preferably wound in such a direction that the torque transmitted to the free end of the brake by its frictional engagement in the rotating hub tends to unwrap the brake into more intimate engagement with the interior of the hub so as to augment the expanding action of the thimble 46 and cause the brake to be self-energizing. The braking torque is transmitted through the anchored end 35 of the brake member and lug 36 to the anchor block 32 and through the anchor sleeve 13 to the torque arm 14 which is connected to the frame of the vehicle, not illustrated. When the backward pressure on the sprocket 7 is released by the operator, the elasticity of the brake member 34 and thimble 46 causes these elements to contract to their original positions, the wedge 49 being projected from the recess 51 in the thimble, and the expander sleeve 43 moving to the right to its normal position. A simple but positive control is thus provided for the brake member which, due to its self-energizing action and full surface contact with the interior of the hub 18, forms a very powerful and effective brake.

In the embodiment of the invention illustrated in Figs. 4 to 7 inclusive, a fixed axle member 71 has journalled thereon a driving member 72 by means of anti-friction bearings 73, which driving member is operated by a sprocket 74 non-rotatably connected thereto as by means of splines 75 and held by a split lock ring 76 against a bearing cup member 77 (Figs. 4 and 7) welded or brazed on the driving member. A screw shaft 78 is piloted in the body of the drive member 72 and fixed thereto as by welding or brazing as indicated at 79.

An anchor member in the form of a sleeve 81 of double-D cross-section is mounted on the opposite end of axle 71 and has fixed on its end a torque arm 82 adapted to be connected to the frame of the vehicle to prevent rotation of the anchor sleeve. A thimble 83 (Fig. 6) is mounted on the anchor sleeve 81 adjacent the torque arm 82 and has fixed thereto in any suitable way as by welding or brazing a bearing cup 84. A wheel hub 85 is journalled in the bearing cups 77 and 84 as by means of anti-friction bearings 86 and 87 in said cups cooperating with cones 88 and 89 formed on the ends of said hub. Spoke flanges 91 and 92 are mounted on the hub preferably by knurling the hub as illustrated in Fig. 6 and forcing the flanges on the hub against shoulders 93 and 94 so positioned that the spoke flanges cooperate with the bearing cups 77 and 84 to enclose the bearings 86 and 87.

A cylindrical anchor block 95 having a double-D bore 96 is non-rotatably mounted on the anchor sleeve 81 and forms a bearing for a spiral brake member 97, one end 98 of which is anchored by means of a pin 99 against an abutment 101 rigidly connected to the anchor block 95. As here shown, abutment 101 is formed as a lug on a ring 102 welded or brazed to the anchor block as indicated at 103 (Fig. 4).

An expanding thimble for the free end of the brake member 97 is provided in the form of a sectional ring 104 having lugs 105 entering notches 106 in the anchor member 95 to prevent rotation of the ring and having a tapered bore 107. The sections of the ring 104 are normally held in contracted position by means of a spring member 108 surrounding the same and seated in a groove 109 in the periphery thereof.

An expander for the ring 104 is provided in the form of a cone member 111 having a double-D bore 112 slidably engaging a reduced portion 113 of the anchor sleeve 81 and arranged to enter the tapered bore 107 of the ring 104.

An actuating member 114 in the form of a clutch nut is threaded on the screw shaft 78 for automatic traversal thereon into and out of engagement with the expander member 111 upon rotation of the driving member, a spring detent 115 anchored to the expander member 111 being arranged to bear frictionally on the actuating member 114 to ensure such traversal.

A driven clutch member 116 is arranged to be engaged and driven by the actuating member 114 upon forward rotation of the driving member. As here illustrated, the driven clutch member 116 is connected to the hub 85 for rotation therewith by means of radial pins 117 traversing openings 118 in said hub. The openings 118 are preferably somewhat larger than the pins 117 so as to allow a slight amount of longitudinal motion of the pins therein. The clutch member 116 is arranged in abutting engagement with the body of the driving member 72. The clamping action of the actuating member 114 is thus taken directly by the body of the driving member without transmitting thrust forces to the wheel hub 85 and accordingly to the wheel bearings 86. Pins 117 are preferably retained in the hub 85 by locating the openings 118 beneath the spoke flange 91 which accordingly acts as a closure thereof.

In the operation of this embodiment of the invention, forward rotation of sprocket 74 is transmitted to the driving member 72 and screw shaft 78, causing traversal of the actuating member 114 to the right in Fig. 4, clamping the driven clutch member 116 to the driving member and transmitting rotation through the pins 117 to the hub 85. When rotation of the driving member stops, actuating member 114 backs away and releases the driven clutch member 116, allowing the hub 85 to overrun. Backward rotation of the driving member causes the actuating member 114 to engage the expander cone 111 and move it to the left in Fig. 4, thus expanding the ring 104 and consequently the free end of the brake member 97 into engagement with the interior of the hub. The brake is thus caused to unwrap in the hub and engage it with a self-energizing action, the resultant braking torque being transmitted through the abutment 101 and anchor block 95 to the anchor sleeve 81 and torque arm 82. Upon release of the backward pressure on the driving member, the spring ring 108 contracts the expanding ring 104 and the parts return to their idle or coasting positions.

In Figs. 8, 9, 10 and 11 of the drawings an embodiment of the invention is illustrated in which the brake operating mechanism is substantially similar to that illustrated in Fig. 1, but novel means are provided for mounting and rotating the hub and spoke flanges. As there illustrated, an axle 121 has rotatably mounted thereon a driving member 122 as by means of bearings 123. A screw shaft 120 is fixed in the body of the driving member as by welding or brazing. An anchor member in the form of a sleeve 124 of double-D cross-section mounted on the opposite end of the axle, carries an anchor block 125 to which is anchored one end 126 of a spiral brake 127, the free end of which is expanded by means of a split thimble 128 under the action of a wedge 129 and an expander member 131, as described in connection with the first embodiment of the invention.

In the present embodiment of the invention, a cylindrical wheel hub 132 is provided with notches in its ends, and spoke flanges 133 and 134 are arranged to bear on the ends of the hub and are provided with lugs seating in said notches to non-rotatably connect the flanges to the hub. As shown in Fig. 9, spoke flange 133 has four lugs 135, whereas the end of the hub has eight notches 136. A bearing cone 137 is mounted in the end of the hub 132 and is provided with four radial lugs 138 occupying the notches 136 of the hub in alternation with the lugs 135 of the spoke flange 133. A bearing cup 139 is mounted on the end of the anchor member 124 adjacent an anchor arm 141 fixed thereto as indicated at 142. Anti-friction bearings 143 cooperate with the cone 137 and cup 139 to rotatably support the hub 132 on the anchor sleeve 124. Bearing cup 139 cooperates with the spoke flange 133 to enclose bearings 143.

As illustrated in Fig. 10, spoke flange 134 is provided with inwardly extending lugs 144 seated in notches 145 in the end of the hub 132 to non-rotatably connect the spoke flange to the hub. A bearing cup 146 (Fig. 8) is seated within the spoke flange 134. Anti-friction bearings 147 in said cup cooperate with a bearing cone 148 formed on the driving member 122 to rotatably support the hub 132 on the driving member.

An actuating member in the form of a nut 149 is threaded on the screw shaft 120 and provided with an external conical surface 151 adapted to cooperate with a driven cone clutch member 152. As illustrated in Figs. 8 and 10, clutch member 152 is splined in the hub 132 by means of grooves 153 formed in the periphery of the clutch member and adapted to receive the inner ends of lugs 144 of the spoke flange 134. Actuating member 149 can thus clamp the driven clutch member against the body portion of the driving member 122 without transmitting longitudinal thrust to the hub 132 or bearings 147.

In this embodiment of the invention, a drive sprocket 154 is mounted on the driving member 122 by means of splines 155 and a lock ring 156 as in the first embodiment of the invention. In this embodiment, however, an enclosure thimble 157 for bearings 147 is provided which is also arranged to act as an anti-rattling device for the sprocket 154. For this purpose, thimble 157 is provided with an inwardly extending flange 158 (Fig. 11) in which are formed spring fingers 159. Flange 158 is arranged to engage a shoulder 161 on the driving member 122, while spring fingers 159 bear yieldingly against the sprocket 154 to press it against the lock ring 156 and thereby take up any lost motion which might cause rattling of the sprocket. The spring fingers are preferably cut shorter than the depth of the flange 158 so as to provide notches for the reception of splines 155.

In the operation of this embodiment of the invention, forward rotation of the driving member 122 causes the actuating member 149 to engage the clutch member 152 and clamp it to the driving member for rotation therewith, which rotation is transmitted through lugs 144 of spoke flange 134 to the hub 132. On backward rotation of the driving member 122, the actuating member 149 engages the expander member 131 and causes it to expand the brake 127 as described in connection with the first embodiment of the invention.

Although certain embodiments of the invention have been shown and described in detail, it will be understood that other embodiments are possible and various changes may be made in the design and arrangements of the parts without departing from the spirit of the invention as defined in the claims appended hereto.

What is claimed is:

1. In a hub brake for velocipedes, a driving member, an anchor member, a wheel hub journalled on the driving and anchor members, a spiral brake member having one end in abutting relation with the anchor member to prevent forward rotation of the brake member, an expansible thimble within the free end of the brake member non-rotatably connected to the anchor member, expanding means therefor including a member slidably but non-rotatably connected to the anchor member, and an actuating member threaded on the driving member and movable by backward rotation of the driving member to engage and actuate the expanding member.

2. In a hub brake for velocipedes, an axle, a driving member journalled on one end thereof, an anchor member mounted on the other end thereof, a wheel hub journalled on the driving and anchor members, a spiral brake member having one end in abutting relation with the anchor member and so arranged that movement of the free end thereof in the direction of forward rotation of the hub causes the brake to expand into engagement with the interior of the hub, an expansible thimble within the free end of the brake member non-rotatably connected to the anchor member, expanding means therefor including a member slidably but non-rotatably connected to the anchor member, and an actuating member threaded on the driving member and movable by backward rotation of the driving member to engage and move the expanding member longitudinally to expand the thimble within the end convolution of the brake member.

3. In a hub brake for velocipedes, a rotatable driving member, a fixed anchor sleeve, a wheel hub journalled on the driving member and anchor sleeve, an anchor block non-rotatably mounted on the anchor sleeve, a spiral brake member mounted on the anchor block and fixed at one end thereto, expanding means for the free end of the brake including a cylindrical member slidably but non-rotatably mounted on the anchor sleeve, a split thimble non-rotatably mounted thereon fitting within the free end of the brake, and means on the slidable member whereby longitudinal movement of the slidable member expands the thimble, and an actuating member movable by backward rotation of the driving member to actuate the slidable member.

4. In a hub brake for velocipedes, a rotatable driving member, a fixed anchor sleeve, a wheel hub journalled on the driving member and anchor sleeve, a cylindrical anchor block non-rotatably mounted on the anchor sleeve, a spiral brake member mounted on the anchor block and fixed at one end thereto, expanding means for the free end of the brake including a member slidably but non-rotatably mounted on the anchor sleeve, a split cylindrical thimble mounted thereon fitting within the free end of the brake and non-rotatably connected to the anchor block, and wedging means on the slidable member whereby longitudinal movement of the slidable member expands the thimble, and an actuating member threaded on the driving member and movable by backward rotation thereof to actuate the slidable member to expand the brake.

5. In a coaster brake, a driving member including a bearing member and a screw shaft, an anchor sleeve having a non-circular cross-section, a fixed torque arm rigidly mounted on the anchor sleeve, a bearing member rotatably mounted on the anchor sleeve adjacent said arm, a wheel hub journalled on the driving member and anchor sleeve by means of said bearings, an anchor block slidably but non-rotatably mounted on the anchor sleeve, an expansible cylindrical brake member mounted on the anchor block and fixed at one end thereto, a brake actuating sleeve slidably but non-rotatably mounted on the anchor sleeve, an expansible thimble non-rotatably mounted on the actuating sleeve within the free end of the brake, means whereby longitudinal movement of the actuating sleeve expands the thimble, and a nut on the screw shaft actuated by backward rotation of the shaft to operate the brake actuating sleeve.

6. In a coaster brake, a driving member including a body portion and a screw shaft, said body portion having a shoulder adjacent the end of the screw shaft, a wheel hub journalled on the driving member, a driven clutch member slidably mounted in the hub member surrounding the screw shaft adjacent said shoulder, keying means extending radially through the hub into the driven clutch member to transmit rotation from the driven clutch member to the hub, a spoke flange fixed to the hub surrounding and retaining the keying means, and a driving clutch member threaded on the screw shaft arranged to clamp the driven clutch member against the shoulder.

7. In a coaster brake, a driving member including a body portion and a screw shaft, said body portion having a shoulder adjacent the end of the screw shaft, a wheel hub journaled on the driving member, a driven clutch member slidably mounted in the hub member surrounding the screw shaft adjacent said shoulder, a spoke flange mounted on the hub having keying means extending radially through the hub and engaging with the driven clutch member to spline the clutch member to the hub, and a driving clutch member threaded on the screw shaft arranged to clamp the driven clutch member against the shoulder.

8. In a coaster brake for bicycles, a hub, an axle, a driving member journalled thereon, an overrunning clutch between the driving member and hub, brake means for the hub actuated by reverse rotation of the driving member, a sprocket mounted on the driving member, said sprocket having spaced keyways in its bore, the driving member having peripheral lugs fitting said keyways, said lugs having shoulders forming abutments for the sprocket, and a locking ring seated in the periphery of the driving member confining the sprocket thereon.

9. In a coaster brake for bicycles, a hub, an axle, a driving member journalled thereon, an overrunning clutch between the driving member and hub, brake means for the hub actuated by reverse rotation of the driving member, a sprocket mounted on the driving member, said sprocket having spaced keyways in its bore, the driving member having peripheral lugs fitting said keyways, said lugs having shoulders forming abutments for the sprocket, a sealing ring on the driving member, notched to accommodate the lugs and bearing against the shoulders, said member having a peripheral groove, and a locking ring seated in the groove bearing against the sprocket.

10. In a driving hub for bicycles, an axle, a driving member journalled thereon, a sprocket mounted on the driving member, said sprocket having spaced keyways in its bore, the driving member having peripheral lugs fitting said keyways, said lugs having shoulders forming abutments for the sprocket, a sealing ring on the driving member interposed between the sprocket and shoulders, notched to accommodate the lugs and having spring arms bearing against the sprocket, and a locking ring on the driving member confining the sprocket thereon against the pressure of said arms.

11. In a bicycle hub, an axle, a bearing cup fixed thereon, a hub shell extending within the cup and having radial notches in one end, a bearing cone seated in said end of the hub shell having radial lugs in said notches, and anti-friction bearings interposed between the cup and cone.

12. In a bicycle hub, an axle, a bearing cup fixed thereon, a cylindrical hub shell having one end located within the cup, and having radial notches in said end, a bearing cone seated in said end of the hub shell having radial lugs in certain of said notches, a spoke flange seated on said end of the hub shell and having inwardly directed lugs seated in the remainder of said notches, and anti-friction bearings interposed between the cup and cone.

13. In a bicycle hub, a cylindrical hub shell having radial notches in one end, a dished spoke flange seated on said end of the shell with lugs in said notches, a bearing cup in the spoke flange, and a driving member extending into the hub shell and journalled in the bearing cup.

14. In a bicycle hub, a cylindrical hub shell having radial notches in one end, a dished spoke flange seated on said end of the shell with lugs extending inwardly through said notches, a bearing cup in the spoke flange, a driving member extending into the hub shell and journalled in the bearing cup, a driven clutch member in said end of the shell having peripheral notches to receive the inner ends of said lugs, and means including a driving clutch member threaded on the driving member for clamping the driven clutch member to the driving member.

STANLEY B. KURZINA, Jr.